(12) United States Patent
Franke et al.

(10) Patent No.: US 10,742,436 B2
(45) Date of Patent: Aug. 11, 2020

(54) METHOD AND SYSTEM FOR RECORDING A MULTIUSER WEB SESSION AND REPLAYING A MULTIUSER WEB SESSION

(71) Applicant: NEC EUROPE LTD., Heidelberg (DE)

(72) Inventors: Joern Franke, Frankfurt (DE); Ernoe Kovacs, Stuttgart (DE); Mischa Schmidt, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 15/032,646

(22) PCT Filed: Oct. 29, 2013

(86) PCT No.: PCT/EP2013/072591
§ 371 (c)(1),
(2) Date: Apr. 28, 2016

(87) PCT Pub. No.: WO2015/062631
PCT Pub. Date: May 7, 2015

(65) Prior Publication Data
US 2016/0266730 A1    Sep. 15, 2016

(51) Int. Cl.
*H04L 12/18* (2006.01)
*G06F 16/954* (2019.01)
(Continued)

(52) U.S. Cl.
CPC ........ *H04L 12/1831* (2013.01); *G06F 3/0481* (2013.01); *G06F 11/3438* (2013.01);
(Continued)

(58) Field of Classification Search
USPC ........................................ 715/753, 751, 704
See application file for complete search history.

(56) References Cited

U.S. PATENT DOCUMENTS 5,717,879 A * 2/1998 Moran ................ G06F 9/45512
707/999.002
7,441,000 B2 10/2008 Boehringer et al.
(Continued)

OTHER PUBLICATIONS

Chengzheng Sun et al: "Capturing causality by compressed vector clock in real-time group editors", Parallel and Distributed Processing Symposium., Proceedings International, IPDPS 2002, Abstracts and CD-ROM FT., Apr. 15, 2002 (Apr. 15, 2002), pp. 558-565, XP010591082.
(Continued)

*Primary Examiner* — Christopher J Fibbi
(74) *Attorney, Agent, or Firm* — Leydig, Voit & Mayer, Ltd.

(57) ABSTRACT

A method for recording a multiuser web session includes recording events, data requests and corresponding data responses of the multiuser web session according to their occurrence. A method for replaying a multiuser web session includes replaying events, data requests and corresponding data responses of a recorded multiuser web session. This can be performed by scheduling the events, data requests and corresponding data responses according to their recorded occurrence, transferring the scheduled events, data requests and corresponding data responses to a client for replaying and replaying the recorded multiuser web session based on the scheduled events, data requests and corresponding data responses.

28 Claims, 6 Drawing Sheets

(51) Int. Cl.
*G06F 3/0481* (2013.01)
*G06F 11/34* (2006.01)
*H04L 29/06* (2006.01)
*H04L 29/08* (2006.01)

(52) U.S. Cl.
CPC .......... G06F 16/954 (2019.01); H04L 65/403 (2013.01); H04L 67/02 (2013.01); *G06F 11/3476* (2013.01); *G06F 2201/86* (2013.01); *G06F 2201/865* (2013.01); *G06F 2201/875* (2013.01)

(56) References Cited

U.S. PATENT DOCUMENTS

| | | | |
|---|---|---|---|
| 2004/0230793 A1* | 11/2004 | Estrada | H04L 29/06027 713/156 |
| 2006/0200520 A1* | 9/2006 | Vernon | H04L 29/06027 709/204 |
| 2007/0266304 A1* | 11/2007 | Fletcher | G06F 17/241 715/230 |
| 2008/0077671 A1 | 3/2008 | Rust | |
| 2009/0164581 A1 | 6/2009 | Bove et al. | |
| 2009/0248900 A1* | 10/2009 | Marucheck | G06F 1/14 709/248 |
| 2011/0161834 A1* | 6/2011 | Shadfar | H04L 65/4038 715/753 |
| 2012/0159305 A1 | 6/2012 | Amrhein et al. | |
| 2014/0033073 A1* | 1/2014 | Pegg | H04L 65/403 715/753 |
| 2014/0081987 A1* | 3/2014 | Ojanpera | G06F 17/30044 707/748 |

OTHER PUBLICATIONS

Dietwig Lowet et al: "Co-browsing dynamic web pages", International World Wide Web Conference 18$^{th}$; Apr. 20, 2009-Apr. 24, 2009, Apr. 20, 2009 (Apr. 24, 2009), pp. 941-950, XP058025665.

* cited by examiner

METHOD AND SYSTEM FOR RECORDING A MULTIUSER WEB SESSION AND REPLAYING A MULTIUSER WEB SESSION

CROSS-REFERENCE TO PRIOR APPLICATION

This application is a U.S. National Phase Application under 35 U.S.C. § 371 of International Application No. PCT/EP2013/072591, filed on Oct. 29, 2013. The International Application was published in English on May 7, 2015 as WO 2015/062631 A1 under PCT Article 21(2)

FIELD

The invention relates to a method for recording a multiuser web session, preferably a cobrowsing session.

The invention relates also to a method for replaying a multiuser web session.

The invention further relates to a system for recording a multiuser web session, preferably a cobrowsing session and a system for replaying a multiuser web session, preferably a cobrowsing session.

BACKGROUND

Collaborative web browsing enables different participants to have the same synchronized view on the web content displayed, for example they should see each others mouse pointers and a current web page. A use case for a collaborative web browsing session is for example when an insurance clerk helps a customer to fill out a form on a web page. The clerk should be able to see the customer's view on the web page and vice versa. A further use case is for example a call center: In call centers today it is required that audio and/or video calls can be recorded for future service improvements and/or legal reasons.

For performing collaborative web browsing a standard browser to access the service is sufficient, i.e. browser plugins or browser extensions are not required.

For example in U.S. Pat. No. 7,441,000 B2, in US 2009/0164581 A1 or in US 2012/0159305 A1 conventional methods and systems for performing cobrowsing sessions are shown.

One of the disadvantages is, that they do not support recording and replaying of cobrowsing sessions. A further disadvantage is that they do not give editors like web editors of a web page or participants in the multiuser web session a fine-grain control of recording.

To overcome this problem one of the conventional solutions is to take a video of the screen and record it, for example with the tool "snagit", available under <<http://www.techsmith.com/snagit.html>>. However one disadvantage of such a solution recognized by the inventors is that proprietary software has to be installed and the video data in particular of a longer cobrowsing session is very huge. Therefore it is impracticable to store such an amount of video data. Furthermore this conventional solution is very inflexible: The video cannot be changed and it is impracticable to analyze the stored video, for example to make optimizations for a customer service. Even further only a view of one participant can be stored, i.e. if a plurality of views are to be stored the view of each participant has to be stored leading to a huge amount of data to be saved.

SUMMARY

In an embodiment, the present invention provides a method for recording a multiuser web session which includes recording events, data requests and corresponding data responses of the multiuser web session according to their occurrence. In the same or another embodiment, the present invention provides a method for replaying a multiuser web session, which includes replaying events, data requests and corresponding data responses of a recorded multiuser web session. This can be performed by scheduling the events, data requests and corresponding data responses according to their recorded occurrence, transferring the scheduled events, data requests and corresponding data responses to a client for replaying and replaying the recorded multiuser web session based on the scheduled events, data requests and corresponding data responses.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a system according to a first embodiment of the present invention;

FIG. 2 shows a system according to a second embodiment of the present invention;

FIG. 3 shows part of a method according to a third embodiment of the present invention;

FIG. 4 shows part of a method according to a fourth embodiment of the present invention;

FIG. 5 shows part of a method according to a fifth embodiment of the present invention and FIG. 6 shows part of a method according to a sixth embodiment of the present invention.

DETAILED DESCRIPTION

Although applicable to multiuser web sessions in general the present invention will be described with regard to a collaborative web browsing session or cobrowsing session.

In an embodiment, the present invention provides a method and a system for recording a multiuser web session respectively replaying a multiuser web session being more flexible.

In an embodiment, the present invention provides a method and a system for recording respectively replaying a multiuser web session, which are easy-to-implement.

In an embodiment, the present invention provides a method and a system for recording respectively replaying a multiuser web session which require less resources for storing respectively replaying.

In an embodiment, the present invention provides a method and a system for recording respectively replaying a multiuser web session enabling a correct user perception during replay.

In an embodiment, the present invention provides a method and a system for recording respectively replaying a multiuser web session giving participants in as well as editors of content for the multiuser web session a flexible and fine grain control over recording and replaying of the multiuser web session.

In an embodiment, a method for recording a multiuser web session, preferably a cobrowsing session is defined. According to this embodiment, the method provides that events, data requests and corresponding data responses of the multiuser web session are recorded according to their occurrence.

In an embodiment, a method for replaying are multiuser web session is defined, preferably recorded with a method according to the embodiment described above. According to this embodiment, the method provides that events, data requests and corresponding data responses of a recorded multiuser web session are replayed by scheduling the events, data requests and corresponding data responses according to their recorded occurrence, transferring the scheduled events, data requests and corresponding data responses to a client for replaying replaying the recorded multiuser web session based on the scheduled events, data requests and corresponding data responses.

In an embodiment, a system for recording a multiuser web session, preferably a cobrowsing session, preferably for performing with a method according one of the embodiments described above, is defined. According to this embodiment, the system includes a user client operable to perform a multiuser web session and a server operable to record events, data requests and corresponding data responses of the multiuser web session according to their occurrence.

In an embodiment, a system for replaying a multiuser web session, preferably a cobrowsing session, preferably recorded with a system according to the embodiment described above and/or with a method according to one of the embodiments described above is defined. According to this embodiment, the system includes a server operable to schedule the events, data requests and corresponding data responses according to their recorded occurrence and to transfer the scheduled events, data requests and corresponding responses to a client for replaying and by a client operable to replay the recorded multiuser web session based on the scheduled events, data requests and corresponding responses.

The term "data" is to be understood in the broadest sense. Data may for example be a data request, a data response, an embedded object with content, header and content of a HTML page, or the like.

The terms "data request" and "data response" refer preferably to data in general being requested resp. responded and is not limited to any kind of specific data.

The term "embedded object" is to be understood in the broadest sense. In particular the term "embedded object" is not restricted to HTML <embed> tags.

Further a corresponding data response to a data request includes not only a correct response with the requested data but may also contain wrong data in terms of the requested data or no data or a response may also be absent, so that a corresponding data response may be a timeout.

Even further a multiuser web session is preferably a cobrowsing session, but may also be any session in which at least two users interacting with each other on the same information. For example a multiuser web session can be a standard WebRTC session, a joint document editing session, a realtime communication session using audio and/or video or a data exchange session or the like.

According to an embodiment of the invention it has been recognized that browser plugins or extensions are not necessary thus enabling a wide-spread and easy use, in particular use across devices like smartphones, tablets or the like is enabled.

According to an embodiment of the invention it has been further recognized that flexibility is enhanced since for example during a cobrowsing session participants of the cobrowsing session may provide information about the web page they are currently on and events occurring on this web page to the other participants.

According to an embodiment of the invention it has been further recognized that recording and replaying are performed such that multiple users may watch different parts of the recording multiuser web session, i.e. the right web application data for their part is provided. During replay a viewer of the multiuser web session may switch between views of different participants of the multiuser web session.

According to an embodiment of the invention it has been further recognized that flexibility is significantly enhanced, since a deviation from the recorded multiuser web session is enabled: For example a deviation includes an interruption of the replayed multiuser web session to perform actions on the interrupted multiuser web session and reinitiate replaying with the amendments performed. Even further integration of outside data, preferably live data and/or deviation from a navigation path is enabled during replay. For example during replay of the recorded multiuser web session a user may decide to deviate from the recorded data. The integration of live data is enabled for example by instructing the replay procedure not to use the recorded data but to use the live service data. For instance the user may decide to use a current list of accounts instead of the saved account data. If the user wants to deviate from a navigation path during replay the user may use an alternative functionality of a web page, for example list all transactions of a user. This is in particular advantageous for briefings or root cause analysis. Even further during replay of a multiuser web session, a user might be presented with one or more options to continue the recorded session or to deviate from the recorded session, e.g. by presenting a button "Do you like to load the actual list of accounts? Yes/No".

According to a preferred embodiment events occurring during the multiuser web session are ordered. For example during a cobrowsing session events occurring in one participant's browser are distributed to the browsers of the other participants. By ordering the events an inconsistent view, i.e. different views on the web page by different participants is avoided, enabling that all participants replay events in the same order.

According to a further preferred embodiment time stamps associated with the events and the event ordering are recorded. This enables in an easy way that the events are executed according to this order and provides all information for replaying the multiuser web session for human perception with high quality. The time stamps ensure that events later are only replayed when they are needed and not all at once. The ordering ensures that they will replay in the right order as it was imposed for example by a cobrowse event server to resolve potential conflicts. For instance if one participant of a cobrowsing session clicks on link "A" and at the same time another participant clicks on a link "B" a cobrowse event server imposes the order so that all participants in the corresponding cobrowsing session will follow eventually link "A" and not some participants link "A" and other participants link "B". Ordering may also be performed on a client by using time stamps of the client. However a server will record the order based on the information provided by the corresponding clients, for example using vector clocks. Such a vector clock approach is for example described in Mattern, F., "Virtual time and global states of distributed systems", Parallel and Distributed Algorithms, 1989, which is incorporated by reference herein.

According to a further preferred embodiment the events are ordered according to an arrival time at an event server and/or according to time stamps and/or according to event related information This enables to resolve a potential conflict between the event ordering and the time stamp: For example events may arrive at different times at the event server not corresponding with their (absolute) time stamp, when they have been occurred on the respective browsers. This reflects for example network delays in the network connecting the clients and the event server. Therefore when ordering is performed based on the arrival time of the events at the server, there will be no conflict based on the time stamps. Event related information may any information enabling an ordering of events or at least a conflict resolution in case of conflicting events aside from time stamps. For example event related information may be information for the event conflict resolution like additional information generated for that purpose.

According to a further preferred embodiment when an ordering conflict of events occurs, correction information is generated and used for event conflict resolution. This enables to easily perform conflict resolution and ordering independently from each other: When correction information is generated by a conflict resolution service, an ordering service might use this information to amend ordering of the events, so that the ordering of events is correct.

According to a further preferred embodiment in case of an event arrival conflict between two events, the time stamp difference between the two events is determined and when the time stamp difference is negative, the absolute value of difference is used for recording the two events. For example when the ordering of events is done based on the arrival of the events at the event server a conflict may be caused due to the creation of the corresponding time stamps in the users' browser: Network delays may cause events to be ordered contrary to their time stamp. This is however not a problem for the "live" cobrowsing but causes a problem when replaying the cobrowsing session later since the time stamp is used to a time properly the recorded events: For example when the event server has received event "A" with time stamp "0" after event "B" with time stamp "5" it is ordered that event "B" occurred before event "A". However when replaying the events based on the time stamps, this means that event "A" has occurred before "B" which is contrary to their real event ordering performed by the cobrowsing event server. Therefore the conflict is solved by determining the time difference between the time stamps of the events and in case of a negative time stamp difference between the events, here in the example 0−5=−5, it may be multiplied by −1 to obtain a positive timing difference in case of two conflicting events. Such conflict resolution might lead to a slightly different replaying of the multiuser web session.

According to a further preferred embodiment in case of an event arrival conflict between more than two events, the time stamp difference between the earliest and the latest event according to their time stamps is determined and all events are then ordered in predetermined distances, preferably equally, to each other on the determined time stamp difference period. This enables in an easy way to resolve conflicts between more than two events: For example if there are conflicts between several events the time stamp of the "earliest" event is take in the time stamp of "latest" event is taken and the time period between them is determined. The events are than scheduled, preferably in equal distance to each other on this time period.

According to a further preferred embodiment the time stamps of the events are generated once they are executed on the respective clients participating in the multiuser web session, wherein the time stamps are normalized. This provides also an easy-to-implement and non-local generation of the time stamps to resolve conflicts between events. By normalizing the time stamps a "global" time stamp scale is provided for the ordering of the events of the different participating browsers.

According to a further preferred embodiment all different versions of data requests and corresponding data responses are recorded. This ensures that the data recording, for example a data request or data responses in form of HTML pages, etc. considers that different versions for example of the same web page may exist during a multiuser web session: For example a webpage with the same URL such as http://example.com/listallaccounts. For instance this page lists all accounts and later another account is created. Afterwards the list is requested again and includes the new account. Thus all versions of the request are stored enabling a consistent and reliable replay of the recorded multiuser web session later.

According to a further preferred embodiment an increasing version number is assigned to the data requests and data responses based on an identification of the data request. This enables in an easy way to record and to determine during replay a correct version for the data responses to the corresponding data request: For example for each request to the same URL the version number is increased. Afterwards the data request, the data response and the version are stored for replaying them later. This version number may be generated on client and/or on server side. When the version number is generated on the server side, the server has to be aware of the recording system, in particular how recording is performed, and its versioning attributes. Otherwise correct version numbers cannot be provided.

According to a further preferred embodiment data in form of an embedded object is recorded as object reference and/or as object content. For example in a webpage embedded objects like videos or images may be recorded by a reference to them, for example if they represent the static content, which never changes over time. By storing the object reference reduced storing resources for recording are needed. When for example embedded object is recorded with the object content then for example the whole embedded object is downloaded and stored enabling to record also non-static content changing over time for later replay. For recording recording policies like KeepReference, i.e. Reference is stored, RecordOnce, i.e. only the actual version is stored and/or RecordAllVersion, i.e. all versions of an embedded object are stored, may be used. Of course other recording policies are also possible.

According to a further preferred embodiment a participant and/or an editor of embedded objects decides where and/or in which form embedded objects are stored. This enhances the flexibility for a participant of the multiuser web session or an editor of an embedded object allowing them to decide whether an embedded object is for example stored as reference and/or as object content as well as where the object is to be stored, for example the recording location may be the client and/or the server. This enables an end-user for example to perform modifications on recording policies.

According to a further preferred embodiment a storing indication for data, preferably in form of embedded objects, is generated and recorded based on a recording policy and/or on a decision of the participant and/or the editor, preferably visually presented to a participant of the multiuser web session. For example a special HTML tag as a markup option for the editor around an embedded object may be generated which indicates the recording preference for a recording service later. An example is:

```
<span itemprop="recordcontent">
<video src="mysource.mpg">
</span>.
```

When preferably the storing indication is visually presented to a participant, the participant may decide if he follows the storing indication or if he overrides the storing indication, for example by changing the storing location for the corresponding data or the like.

According to a further preferred embodiment recording is performed on a recording server and/or on a client, preferably wherein an end-user decides where recording is performed. For indication of the storing location for participants of the multiuser web session a visual storing indication may be generated for the recording location, preferably based on an end-user decision. For instance when recording is performed on a recording server a browser sends, for example via HTTP, HTTP/2.0 or Websockets, a request to start the recording with the time stamp, for example "download video", "video started at time stamp xx" or the like. The browser may also send a request to stop the recording, for example send a command "Stop Video Recording". The browser may send other relevant events for the recording, for example forwarding, etc. with time stamp information to the recording server. One of the advantages is, that for example a whole video may not need to be stored, because all the participants did not watch it fully. Recording may also be performed on a client respectively at client side. For example a user's browser instructs to download a video and sends it afterwards with the time stamp information and the event information, when it has for example started or stopped. Other events which may be important for the recording, for example forwarding, can be recorded as well and sent to a recording server together with the recorded data. A time stamp when recording is to be started is provided, preferably by using a time stamp of a browser, so that all recording uses the same time stamp. In most cases it may be preferable that an end-user or participant of the multiuser web session is able to override an editor's storing indication.

According to a further preferred embodiment a collaboration object is recorded with the time stamp indicating creation, destruction and/or modification of the collaboration object. Collaboration objects may be voting, chat, annotations or the like and may be created during a multiuser web session. Preferably they are represented by HTML tags/JavaScript code added to the web page during a cobrowsing or multiuser web session. For correct replaying later collaboration objects are advantageously recorded with time stamp for creation, destruction and/or modification. During replay and when an interaction with a collaboration event is performed in the multiuser web session, a replayer or viewer of the replay might branch off the original timeline in the replayed multiuser web session to see what might happen then.

According to a preferred embodiment participant perspective information is stored when recording the multiuser web session. This enables during replay a viewer to switch the perspective from one user perspective, for example its own, to a perspective of an other participant of the multiuser web session.

According to a further preferred embodiment recording is performed based on a predefined recording policy and/or on a decision of a participant and/or an editor.

This enables recording based on a predefined recording policy: A recording policy may for example define a suitable screen resolution for optimal storing the multiuser web session or the like. This enhances therefore storage consumption and also flexibility since e.g. a participant or an editor may deviate from the recording according to the recording policy on demand.

According to a preferred embodiment of the method according to claim 18 only events related to one or more predetermined users are replayed. This enables a faster replay since only events related to one user for example are replayed, e.g. shown. This enables further for example not to show customer mouse moves but only mouse moves by a sales person. Thus user perception is enhanced.

According to a further preferred embodiment during replay of the multiuser web session when a data request is performed, data is provided based on the user and the version of the data. This provides for the user watching the replayed multiuser web session the right version of the data for the data request at the right time. Different users may watch the recorded multiuser web session at the same time but they may watch different parts of the multiuser web session.

According to a further preferred embodiment after each request by the same user of the same multiuser web session a version indication for the data is adapted, preferably increased. This enables in an easy way to serve the correct version: Once the user requested data, for example a HTTP server determines the version for the user and after each request to the same URL by the same user of the same recorded multiuser web session the version number is adapted to serve the correct version.

According to a further preferred embodiment the events, data requests and corresponding responses are stored locally on a client for replaying the multiuser web session and all requests are intercepted and redirected locally for providing a corresponding data response. For example a server might provide all the web data to a JavaScript responsible for replaying a multiuser web session. When the data is locally stored, for example using local storage, then all web data requests are intercepted by overriding the send method, e.g. according to the XMLHTTP request object. For example if a web page now makes a web request it uses the customized send method which returns the locally stored data. In this case there is no connection needed between a replaying browser and the replay server for replaying the recorded multiuser web session.

According to a further preferred embodiment when replaying the recorded multiuser web session, the recorded events are scheduled according to the time they occurred. This allows replaying the recorded events in correct order for correct user perception. For example when replaying a WebRTC session the time stamp is needed when the recorded WebRTC session has been started. Given this time stamp the time within the schedule can be determined when the WebRTC session should be replayed. Furthermore information from which perspective the WebRTC session should be replayed can be used when replaying, for example the customer or the sales agent view. Given the selected perspective only the recorded video/voice data of the other participants may be shown. When replaying embedded objects and if the embedded objects are stored with their content, the content itself has been recorded and then the replaying service replaces all references of the embedded objects in for example a HTML page to the recorded object. If only the reference has been recorded then the embedded object may be fetched from the reference automatically. When replaying embedded objects an embedded object may receive the event that is part of a recording and it may also receive recorded events, for example "start replaying" as well as recording content if needed. Hence the embedded objects can be part of the recording. Even further recorded collaboration objects may be included in the schedule for replaying. If for example recorded HTML/JavaScript code is used representing them, the corresponding collaboration objects are added/modified or moved according to the recording events for them.

According to a further preferred embodiment during replay of a multiuser web session, replaying is interrupted and it is deviated from a recorded navigation path of the multiuser web session. This enables an easy integration of live data for example.

According to a further preferred embodiment a storing indication is visually presented to a viewer of the multiuser web session during replay. This enhances the user perception of the replayed multiuser web session, since the user can easily recognize where and/or in which form the data corresponding to the storing indication is stored.

According to a further preferred embodiment during replay one or more user interface elements, preferably for embedded objects, are presented. This enables in an easy and flexible way to influence replay: For instance a viewer of the multiuser web session might check the version of a presented embedded object, compare the version of presented embedded object against another version of said embedded object or the like.

According to a further preferred embodiment replaying is performed based on a predefined replaying policy and/or on a decision of a participant and/or an editor. This enables replaying based on a predefined replaying policy. A replay policy may for example define a suitable screen resolution for optimal replaying the multiuser web session or the like. This enhances therefore user experience and also flexibility since e.g. a participant may deviate from the replaying according to the replaying policy on demand.

Figure 1:
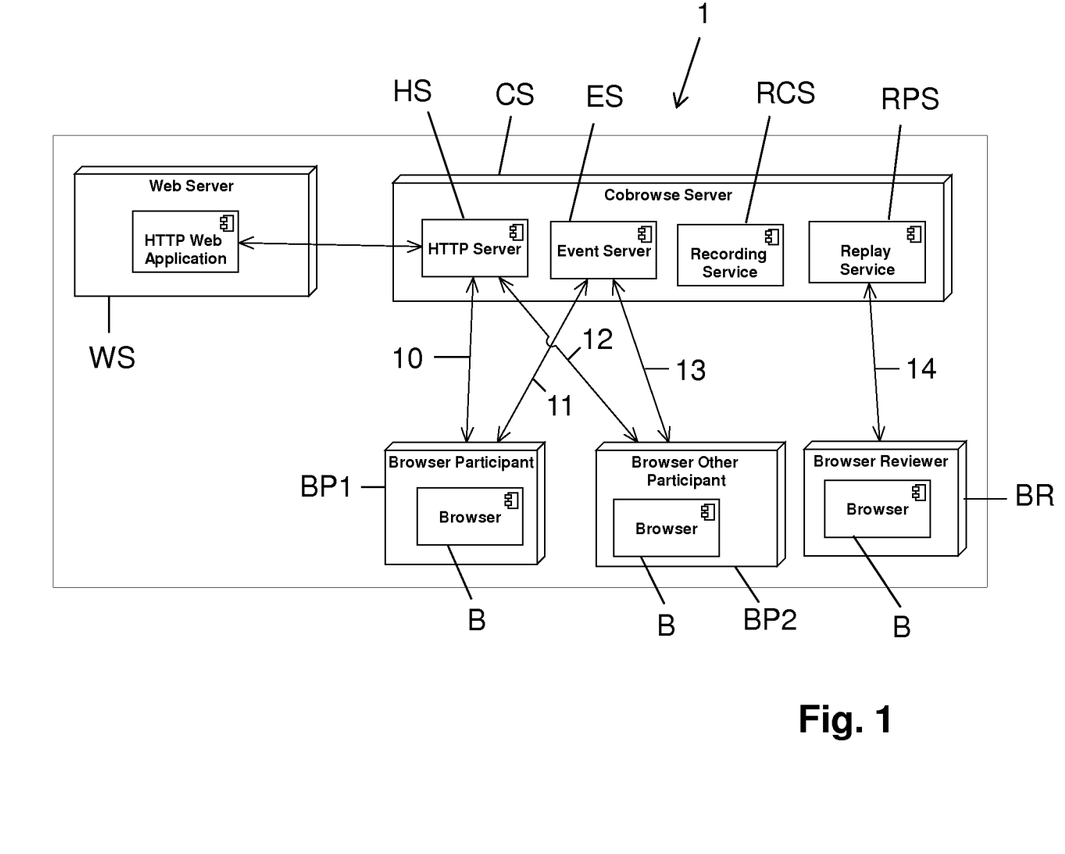

FIG. 1 shows a system according to a first embodiment of the present invention.

In FIG. 1 a system 1 for cobrowse recording and replaying is shown. A plurality of browser participants BP1, BP2 is communicating 10, 12 in a cobrowsing session with a HTTP server HS for browsing. Further each browser B of the browser participants BP1, BP2, interacts 11, 13 with an event server ES for reporting events for example mouse clicks, etc. within the corresponding browsers B. The HTTP server HS interacts with a web server WS which has for example a running HTTP web application, e.g. provides a web page or the like. The HTTP server HS as well as the event server ES are part of a cobrowse server CS. The cobrowse server CS further includes a recording service RCS and a replay service RPS. The recording service RCS records cobrowsing events whereas the replay service RPS provides a replaying service for replaying recorded cobrowse sessions using the recorded cobrowsing events and web data. To record the events and the web data, any type of data base, for example a centralized one or a distributed nonSQL storage may be used. The HTTP server HS as well as the event server ES provide the corresponding data to the recording service RCS for recording.

During a cobrowsing session the participants BP1, BP2 of the cobrowsing session provide information about the web page they are currently on and the events occurring on this web page to the other participants BP1, BP2 via the cobrowse server CS. The HTTP server HS in the cobrowse server CS is used for providing web application data of the current web page to the participants BP1, BP2 of the cobrowsing session, preferably similar to a proxy. The event server ES of the cobrowse server CS is used for providing the events related to a web page that occurred in the browser B of a browser participant BP1, BP2 for example a click, a mouse move or the like, to the other participants BP1, BP2 of the cobrowsing session for replaying them. All participants BP1, BP2 see the same web page and the same state of the web application. The HTTP server HS and the event server ES and the cobrowse server CS provide the events and the data not only to the participants BP1, BP2 of the cobrowsing session but also to the recording service RCS. The replay service RPS of the cobrowse server CS is used after the cobrowsing session to replay the cobrowsing session with all events by a person.

Figure 2:
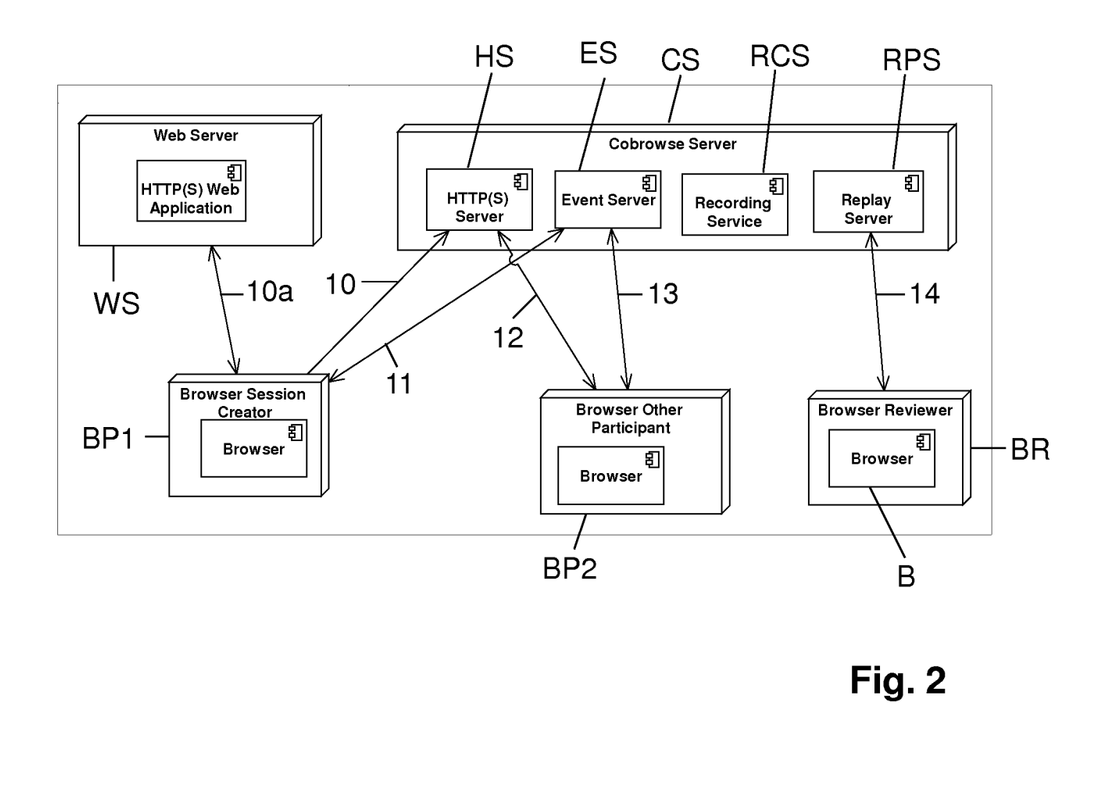

FIG. 2 shows a system according to a second embodiment of the present invention.

In FIG. 2 a system 1 according to FIG. 1 in general is shown. However in contrast to FIG. 1 a privacy-preserving cobrowsing architecture is shown: One of the browser participants BP1, BP2, in FIG. 2 BP1 initiates a browser HTTP session as cobrowsing session with the secure web server WS providing HTTPS. The communication between the web server WS and the creator BP1 of the browser session is denoted with reference sign 10a. The other browser participant BP2 communicates via the HTTP server HS of the cobrowse server CS and the browser B of the first browser participant BP1 with the HTTPS web server WS.

In both figures FIG. 1 and FIG. 2 when a browser reviewer BR wants to replay a stored cobrowsing session, he initiates a connection 14 with the replay service RPS of the cobrowse server and replays the desired session.

Figure 3:
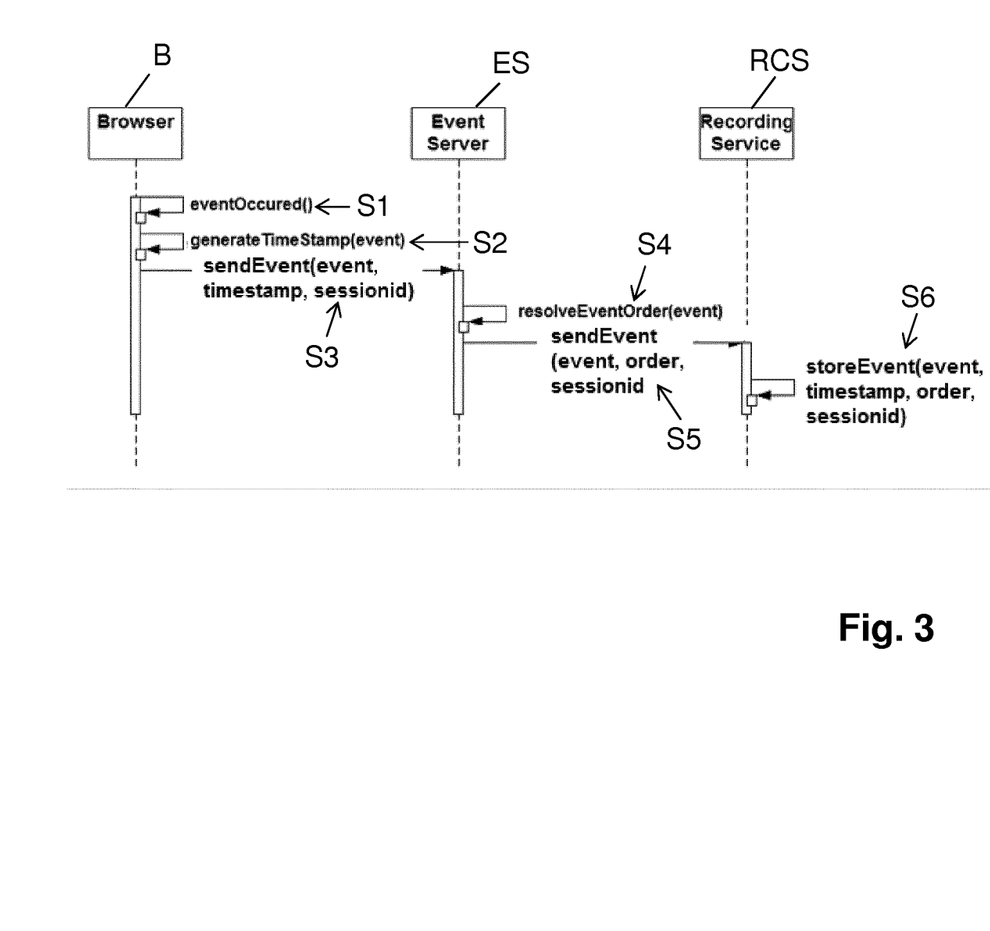

FIG. 3 shows part of a method according to a third embodiment of the present invention.

In FIG. 3 steps for recording events occurring in a cobrowsing session are shown. When the browser B recognizes that an event occurred in a first step S1, a time stamp for the event is generated in a second step S2. In a third step S3 the event is sent to the event server ES together with the time stamp and a session identification for the event occurred. At the event server ES the event server ES orders in a fourth step S4 the events and sends in a fifth step S5 the event together with order information and a session ID to a recording service RCS. In a sixth step S6 the recording service RCS stores the event with its time stamp, its order information and the corresponding session ID. Therefore the event together with its time stamp and the event ordering is stored. This information is then used for replaying later and avoids an inconsistent view, i.e. different views on the web page by different participants. Event ordering ensures that each event has a unique identification, preferably a unique number and that the clients execute the events according to this order. Event ordering may be performed only for certain events where the order is important, for example mouse clicks, whereas for other events, for example mouse moves, this may not be done. The event ordering can be done at the cobrowse server CS side or at the client side, i.e. on a user side, for example by using vector clocks approach.

To avoid that all events of a recorded cobrowsing session are replayed later all at once, the events are scheduled according to the time they occurred. Preferably the time when they occurred in the participants browser is used. One may also use the time when they occurred at the cobrowse server side but due to network conditions for example a lot of events may arrive at the same time which causes conflicts when replaying the events of a recorded cobrowsing session: For example when the event server ES has received event "A" with time stamp "0" after event "B" with time stamp "5" it is ordered that event "B" has occurred before event "A". If this ordering would be replaced based on the time stamps this means that event "A" has occurred before event "B" which is contrary to their real event ordering by the cobrowse event server ES. Therefore ordering may be respected and in case of a negative time difference between the events, herein the example −5 the absolute value is taken to obtain a positive timing difference. This is suitable for conflicts between two events.

In case there are conflicts between several events preferably the time stamp of the "earliest" event and the time stamp of the "latest" event is taken and the time period between them is determined. Then the conflicting events are scheduled in equal distance to each other on this time period. Alternatively the cobrowsing participants BP1, BP2 can generate the time stamp of the events once they are executed. However all cobrowsing participants BP1, BP2 may have different time stamps and they have to be averaged or the like to aggregate them to find a unique one.

Figure 4:
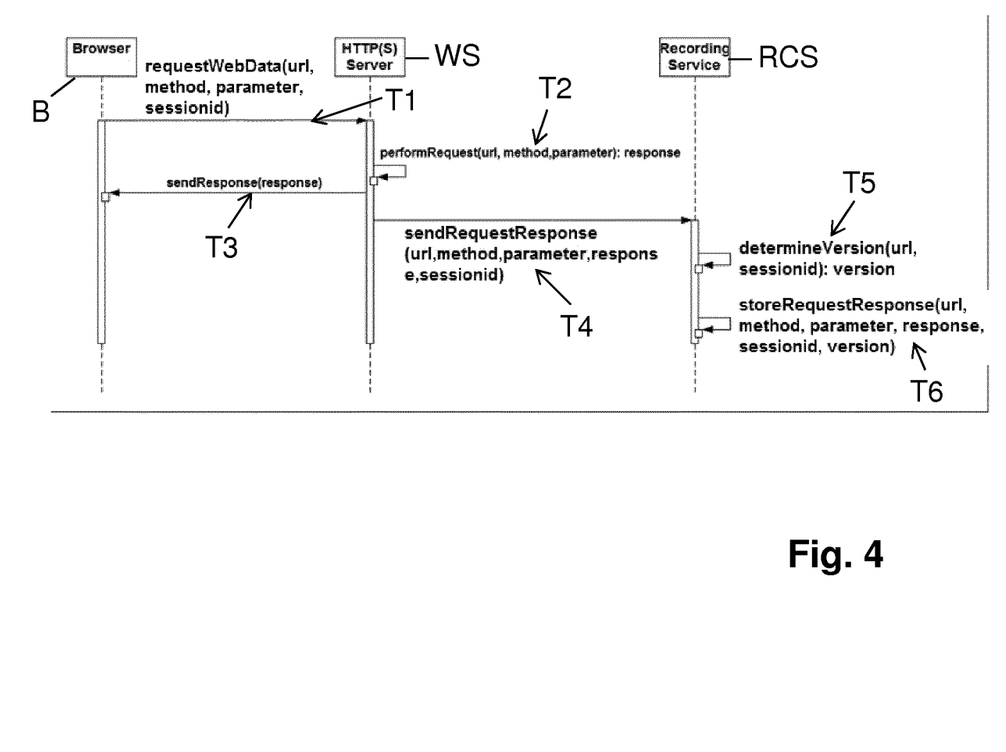

FIG. 4 shows part of a method according to a fourth embodiment of the present invention.

In FIG. 4 a sequence diagram for recording web application data requests and responses for a cobrowsing session are shown. In a first step T1 a browser B requests web data by using URL, method information, parameter information and a session ID of the cobrowsing session for the request. On the web server WS the request is performed in a second step T2 and the corresponding response is provided. In a third step T3 the response is sent back to the browser B. Further the web server WS sends a request response together with the URL, the method information, parameter information, the data of the response and the session ID in a fourth step T4 to a recording service RCS. The recording service RCS then determines a version for the request based on the URL and the session ID in a fifth step T5 and stores in a sixth step T6 the request response with the URL, the method information, parameter information, the response, the session ID and the version for later replay.

In general the data recording, for example requests, HTML pages, etc. considers that different versions of the same web page, i.e. a web page with the same URL may exist during a cobrowsing session. For instance there might be a page to list all accounts and another account is created. Afterwards the list is requested again and includes the new account. Thus, all versions of the request are stored. To determine the version the recording service RCS generates a version number for the request based on the URL. For each request to the same URL the version number is preferably increased. Afterwards the request, the response and the version are stored for replaying them later.

When recording voice or video communication this may be done at the server side or the client side when corresponding application programmable interfaces are available.

For the server side an automated participant of a Web Real Time Communication or WebRTC session may be provided recording all video/voice communication with the others. For the client side the video/voice recording is to be synchronized with the recording of the cobrowsing session since media recording always has relative timing information. This timing information is stored with the recorded media object. Furthermore start point and end point of a WebRTC video/voice session with a certain participant has to be stored. For determining start point and end point the browser's time stamp or the server's time stamp may be used. This can be later used for replaying the cobrowsing session from different perspectives.

Embedded objects in a web page, for example videos or images, may be recorded either by just recording a reference to them, for example if they represent static content which never changes over time or by downloading the whole element/content. A user, a participant of the multiuser web session or an editor of the element/content may decide which option to be used for recording. An editor may use a special HTML tag defined around an element defining the recording preference. An example for such a HTML tag is
<span itemprop="recordcontent">
<video src="mysource.mpg">
</span>.

For instance when requesting web pages in form of HTML5 pages they may contain many different types of content, such as images, documents or videos, and a generic API for recording any embedded content may be defined that can be used by plugins or the browser to do a proper synchronized recording. Recording may be performed at the server side or at the client side. To indicate the recording preference a user may define a special HTML tag around the content defining the recording location.

When recording is performed at the server side, the browser sends to the server, for example via HTTP, HTTP/2.0 or Websockets a request to start recording with the time stamp, for example "download video", "video started at time stamp xxx" or the like. It may also send a request to stop the recording, for example "stop video recording". In any case the browser may send other relevant events for recording, for example "forwarding", etc. with time stamp information to the recording server. In this case for example not the whole video may to be stored because all the participants did not watch it fully.

When recording is performed at the client side it may be provided eventually to the server. For example a user's browser may be instructed to download a video and send it afterwards with the time stamp/event information when it has for example started or stopped. Further, other events being relevant for recording, for example forwarding, can be recorded as well and sent to the server together with the recording. In both cases the time stamp is used when recording should be started. This time stamp may be the one of the browser so that all recording uses the same time stamp. For recording of collaboration objects like voting, chat, annotations or the like which may be created during a cobrowsing session they may be represented by HTML tags/JavaScript code added to the web page during the cobrowsing session. Collaboration objects may therefore be recorded including the time stamp then they have been created, modified and/or destroyed.

Figure 5:
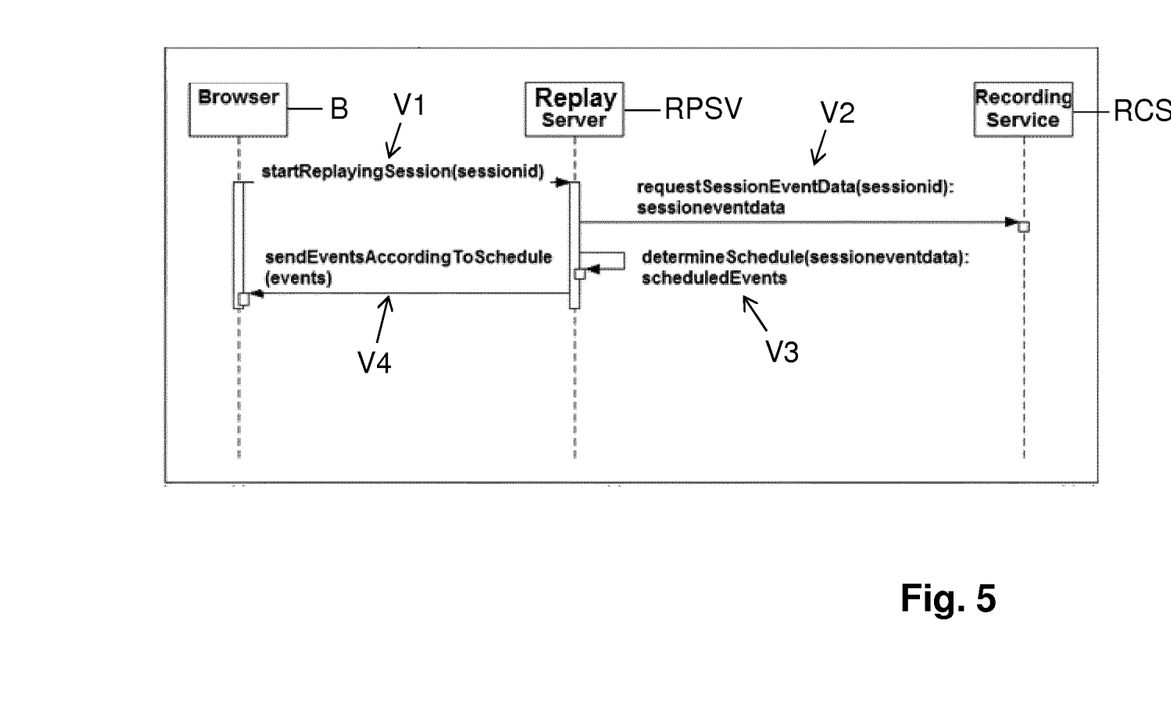

FIG. 5 shows part of a method according to a fifth embodiment of the present invention.

In FIG. 5 a sequence diagram for replaying events of a cobrowsing session is shown. A browser B initiates replay of a recorded session by sending a corresponding start replaying session command including the session ID to be replayed in a first step V1 to a replay server RPSV. In a second step V2 the replay server sends a request for session event data including the session ID to the recording service RCS. In a third step V3 the schedule is determined by the replay server RPSV based on the received session event data provided in the second step V2 back to the replay server RPSV. The replay server RPSV then schedules the events and sends the events according to the schedule in a fourth step V4 back to the browser B for displaying.

In general when replaying cobrowsing events the events are scheduled by taking into account the event ordering and timing information generated during recording. This can be done either on the cobrowse server CS or on a user client depending on the needs and capabilities of the user client.

The events are then delivered to the browser event engine according to the schedule and replayed there, preferably using for example JavaScript APIs. The recorded time stamp may contain absolute timing information, so it is converted to relative timing information by determining the difference between the earlier event and the latest event. Then they are scheduled using the current time. A user may choose to replay only events related to one user, for example do not show customer mouse moves, but only mouse moves by sales person. In case of replaying at the client side, the replay server RPSV may decide to provide all recording information to the browser B, so that no connection is needed between the cobrowse server CS and the browser B during the replay of the recorded cobrowsing session.

Figure 6:
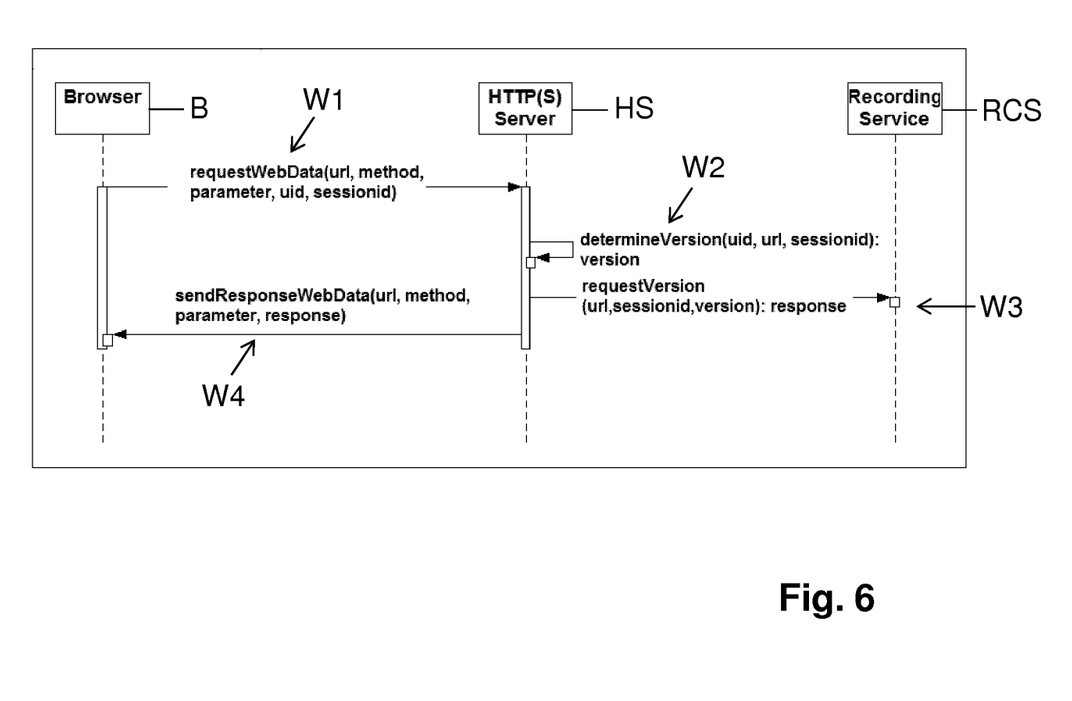

FIG. 6 shows part of a method according to a sixth embodiment of the present invention.

In FIG. 6 a sequence diagram for replaying web data requests is shown. In a first step W1 a browser B requests web data including URL, method information, parameter information, user identification information and session identification information from a HTTP(S) server HS. The HTTP(S) server HS determines the version based on the user identification information, the URL and the session identification information in a second step W2, sends a request for the corresponding version to the recording service RCS in a third step W3 together with the URL, the session identification information and the version and obtains a corresponding response from the recording service RCS. In a forth step W4 the HTTP(S) server HS sends then a response for the request according to step W1 back to the browser B including the URL, the method information, the parameter information and the response data.

The sequence according to FIG. 6 enables to provide for the user watching the cobrowsing session in the right version of the web data at the right time. Different users may watch the recorded cobrowsing session at the same time but they may watch different parts. Once the user requested the data, the HTTP(S) server HS determines the version for the respective user. After each request the same URL by the same user of the same recorded cobrowsing session, the version number is adapted, preferably increased to serve the correct version.

Alternatively the cobrowse server CS might provide all web data to a JavaScript responsible for replaying the cobrowsing session. This script may start the data locally, for example using local storage and intercepts all web data requests by overriding the send method of the XMLHTTP Request object. If the web page makes a web request it uses the customized send method which returns the locally stored data. In this case there is no connection needed between the replaying browser B and the replay server RPSV for replaying the recorded cobrowsing session.

For replaying a WebRTC session the time stamp is used when the recorded WebRTC session has been started. Given this time stamp it may be determined within the schedule that has been mentioned previously when the WebRTC session should be replayed. Further the information from which perspective the WebRTC session should be replayed, for example the customer or the sales agent perspective is used. Given the selected perspective only the recorded video/voice data of the other participants are shown.

For replaying embedded objects either the content itself has been recorded and the replaying service then for example replaces all references of the object in the HTML page to the recorded object or—if only the reference has been recorded—then the browser B will automatically fetch the object from the object reference. For replaying using Application Programming Interfaces API for embedded objects an embedded object may receive the event that is part of a recording. It may also receive recorded events, for example start replaying, as well as recording content if needed.

For replaying of collaboration objects recorded HTML/Javascript code may be used representing them and add/modify/remove it according to the recorded events for them.

In summary the present invention allows a deviation from the recording by integration of live service data and/or by deviation from the original recorded navigation in a web page of a web application. Of course these deviations may be recorded again and the difference is between the deviations and the original recording may be visualized during replaying. The integration of live service data increases the flexibility for a user since the user may instruct the replaying mechanism not to use the recoded data but to use live service data. For instance the user may use an account service for example under the URL <<http://example.com/listallaccounts>> to provide a current list of the accounts and not the recorded list. The user may also decide to stop the replay of a recorded multiuser web session by simply not scheduling events any more at the given point in time. Since the structure of the web side is preserved during recording and replaying the user watching the replay may now use alternative functionality of the web page, for example list all transactions of the user which is very useful for briefings or root cause analysis.

The recording and replaying component may be deployed on a cobrowse server. Scripts for event recording and time stamps may be provided by a web service provider or by the cobrowse server. Further a HTML document with corresponding scripts may be required on the client side so that replaying is enabled in a browser.

The present invention enables recording of a multiuser web session, preferably a cobrowsing session by recording of events, event ordering and time stamp, including e.g. versioned web data requests, of WebRTC sessions, of embedded objects like videos or flash, of application interfaces for embedded objects and/or of collaboration objects.

Further the present invention enables replaying of a multiuser web session, preferably a cobrowsing session, according to event ordering and time stamps with conflict resolution and/or replaying only of selected events, for example from a certain user perspective.

The present invention further enables replaying of the right web data at the right time, of WebRTC sessions, of embedded objects like videos and flash, of application interfaces for embedded objects and/or of collaboration objects.

The present invention increases the flexibility by enabling a deviation from the recording, e.g. by using alternative navigation paths in the recorded web application. The present invention enriches the recording with recent and/or new information from services called by the recorded web application.

The present invention does not rely on browser plugins or extensions, thus providing an easy implementation. The present invention enables to record and replay cobrowsing sessions very similar to how they have happened and does not overload the client's side, preferably the browser with a lot of events so its stuck or crashed.

The present invention enables handling of embedded objects, of collaboration objects and WebRTC sessions. Even further the present invention enables multiple users to watch the same or different parts of the same recording in parallel and enables to deviate from the prerecorded navigation, to explore alternative navigation path and to integrate live data into the recording and compare it with recorded data.

The present invention may be used in traditional education, for example by recording sessions and replay them later for educational purposes, so e.g. that not all students need to meet at the same time. Lectures can be reused in subsequent semesters.

The present invention further may be used to enable a novel form of education by teaching how to integrate an online web service into a product.

The present invention may also be used for non-repudiation: A selling of insurance contracts/banking products may require defining a protocol of the sale towards the customer. This protocol can be done by using session recording and/or replaying.

Even further the present invention may be used in call centers to improve processes in call centers by analyzing call center sessions and demonstrating visually examples of good customer care.

Even further the present invention may be used for public services: For example to integrate processes of different agencies cobrowse recording and replaying may be used to teach them application.

Further the present invention may be used for creating recording/replay for a different versions of a software depending which one is currently used by the customer. For example different people may be taught about different versions of the software.

Even further the present invention may be applicable in public safety: Record and replay how a disaster management software has been used and then learn from this for later crisis responses. Further alternatives may be simulated.

Even further the present invention may be used for a web service testing by simulating of alternative navigation paths and integration of recent data of services called by the recorded web application.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for recording a multiuser web session, comprising:
    recording events, data requests and corresponding data responses of the multiuser web session according to their occurrence using a server, the events being ordered according to their occurrence during the multiuser web session;
    generating time stamps of the events at respective clients participating in the multiuser web session such that the time stamps each indicate a time that the respective events occurred at the respective clients; and
    resolving a conflict of an ordering of the events, whereby:
        based on a conflict of the ordering of two of the events, an absolute value of a difference between the time stamps generated at the respective clients for the two of the events is used; and
        based on a conflict of the ordering among more than two of the events, a difference between an earliest and a latest one of the time stamps of the more than two of the events is determined and used for ordering the more than two of the events in predetermined distances to each other.

2. The method according to claim 1, wherein the more than two of the events are ordered in equal distances to each other based on the determined time stamp difference.

3. The method according to claim 1, wherein the time stamps are normalized.

4. The method according to claim 1, wherein all different versions of the data requests and corresponding data responses are recorded.

5. The method according to claim 1, wherein an increasing version number is assigned to the data requests and corresponding data responses based on an identification of the data request.

6. The method according to claim 5, wherein a participant and/or an editor of embedded objects decides where and/or in which form the embedded objects are stored.

7. The method according to claim 1, wherein data in form of an embedded object is recorded as at least one of object reference or object content.

8. The method according to claim 1, further comprising generating and recording a storing indication for data based on a recording policy and/or on a decision of a participant and/or an editor.

9. The method according to claim 1, wherein the recording is performed on at least one of a recording server or a client.

10. The method according to claim 1, wherein a collaboration object is recorded with a time stamp indicating creation, destruction and/or modification of the collaboration object.

11. The method according to claim 1, wherein participant perspective information is stored during the recording of the multiuser web session.

12. The method according to claim 1, wherein the recording is performed based on a predefined recording policy and/or on a decision of a participant and/or an editor.

13. The method according to claim 1, wherein the multiuser web session is a cobrowsing session.

14. A method for recording and replaying a multiuser web session, the method comprising:
- recording events, data requests and corresponding data responses of the multiuser web session according to their occurrence using a server, the events being ordered according to their occurrence during the multiuser web session;
- generating time stamps of the events at respective clients participating in the multiuser web session such that the time stamps each indicate a time that the respective events occurred at the respective clients; and
- resolving a conflict of an ordering of the events, whereby:
  - based on a conflict of the ordering of two of the events, an absolute value of a difference between the time stamps generated at the respective clients for the two of the events is used; and
  - based on a conflict of the ordering among more than two of the events, a difference between an earliest and a latest one of the time stamps of the more than two of the events is determined and used for ordering the more than two of the events in predetermined distances to each other
- scheduling the events, data requests and corresponding data responses,
- transferring the scheduled events, data requests and corresponding data responses from the server to a client for replaying, and
- replaying the recorded multiuser web session based on the scheduled events, data requests and corresponding data responses.

15. The method according to claim 14, wherein only the events related to one or more predetermined users, which are less than a total amount of users of the multiuser web session, are replayed.

16. The method according to claim 14, further comprising providing, during the replaying of the multiuser web session when a data request is performed, data based on a user and a version of the data.

17. The method according to claim 14, further comprising adapting, after each request by a same user of a same multiuser web session, a version indication for the data.

18. The method according to claim 14, wherein, when replaying the recorded multiuser web session, the recorded events are scheduled according to the time the events occurred.

19. The method according to claim 14, further comprising interrupting the replaying of the recorded web session, and deviating the replaying from the navigation path of the multiuser web session to incorporate the amendments or live service data.

20. The method according to claim 14, wherein a storing indication is visually presented to a viewer of the multiuser web session during the replaying.

21. The method according to claim 14, wherein one or more user interface elements are presented during the replaying.

22. The method according to claim 14, wherein the replaying is performed based on a predefined replaying policy and/or on a decision of a participant and/or an editor.

23. The method according to claim 14, wherein the replaying is interruptible by the client to make amendments which cause a deviation from a navigation path of the recorded multiuser web session.

24. The method according to claim 14, wherein the events, data requests and corresponding data responses are stored locally on the client for replaying the multiuser web session, the data requests for web data being intercepted by the client and redirected to the local storage so as to provide the corresponding data responses.

25. A system for recording a multiuser web session, comprising:
- at least two user clients each including a processor with access to memory and being operable to perform a multiuser web session and to generate time stamps of events occurring at the respective user clients during the multiuser web session, each of the time stamps indicating a time that the respective events occurred at the respective user clients; and
- a server including a processor with access to memory and being operable to record the events, data requests and corresponding data responses of the multiuser web session according to their occurrence, the events being ordered according to their occurrence during the multiuser web session, the server being operable to resolve a conflict of an ordering of the events, wherein:
  - based on a conflict of the ordering of two of the events, an absolute value of a difference between the time stamps generated at the respective clients for the two of the events is used; and
  - based on a conflict of the ordering among more than two of the events, a time stamp difference between an earliest and a latest one of the time stamps of the more than two of the events is determined and used for ordering the more than two of the events in predetermined distances to each other.

26. A system for recording and replaying a multiuser web session, comprising:
- at least two user clients each including a processor with access to memory and being operable to perform a multiuser web session and to generate time stamps of events occurring at the respective user clients during the multiuser web session, each of the time stamps indicating a time that the respective events occurred at the respective user clients; and
- a server including a processor with access to memory and being operable to record the events, data requests and corresponding data responses of the multiuser web session according to their occurrence, the events being ordered according to their occurrence during the multiuser web session, the server being operable to resolve a conflict of an ordering of the events, wherein:
  - based on a conflict of the ordering of two of the events, an absolute value of a difference between the time stamps generated at the respective clients for the two of the events is used; and
  - based on a conflict of the ordering among more than two of the events, a time stamp difference between an earliest and a latest one of the time stamps of the more than two of the events is determined and used for ordering the more than two of the events in predetermined distances to each other,
- wherein the server is further operable to schedule the events, data requests and corresponding data responses of the recorded multiuser web session according to their recorded occurrence and to transfer the scheduled events, data requests and corresponding data responses to a client for replaying; and wherein the at least two user clients are further operable to replay the recorded multiuser web session based on the scheduled events, data requests and corresponding data responses.

27. The system according to claim 26, wherein the at least two clients are further operable to interrupt the replay and allow the respective client to make amendments which cause a deviation from a navigation path of the recorded multiuser web session.

28. The system according to claim 26, wherein the events, data requests and corresponding data responses are stored locally on each of the at least two clients for replaying the multiuser web session, the data requests for web data being intercepted by the respective client and redirected to the local storage so as to provide the corresponding data responses.

* * * * *